United States Patent
Bosua et al.

(10) Patent No.: US 11,006,262 B2
(45) Date of Patent: May 11, 2021

(54) POWER OUTLET AND METHOD FOR USE

(71) Applicant: LIFI Labs, Inc., San Francisco, CA (US)

(72) Inventors: Phillip Bosua, Selby (AU); Marc Alexander, San Francisco, CA (US)

(73) Assignee: LIFI Labs, Inc., San Francisco, CA (US)

( * ) Notice: Subject to any disclaimer, the term of this patent is extended or adjusted under 35 U.S.C. 154(b) by 0 days.

(21) Appl. No.: 16/833,367

(22) Filed: Mar. 27, 2020

(65) Prior Publication Data

US 2020/0228954 A1 Jul. 16, 2020

Related U.S. Application Data

(60) Continuation of application No. 16/290,720, filed on Mar. 1, 2019, now Pat. No. 10,645,558, which is a continuation of application No. 16/163,087, filed on Oct. 17, 2018, now abandoned, which is a continuation of application No. 15/681,797, filed on Aug. 21, 2017, now Pat. No. 10,136,292, which is a continuation of application No. 15/477,251, filed on Apr. 3, 2017, now Pat. No. 9,768,831, which is a division of application No. 14/843,773, filed on Sep. 2, 2015, now Pat. No. 9,648,448.

(60) Provisional application No. 62/044,788, filed on Sep. 2, 2014, provisional application No. 62/164,946, filed on May 21, 2015.

(51) Int. Cl.
*H04B 3/54* (2006.01)
*H04W 4/80* (2018.01)
*G05F 1/12* (2006.01)
*H04W 52/02* (2009.01)
*H04W 84/12* (2009.01)

(52) U.S. Cl.
CPC .............. *H04W 4/80* (2018.02); *G05F 1/12* (2013.01); *H04B 3/54* (2013.01); *H04W 52/02* (2013.01); *H04B 2203/5441* (2013.01); *H04B 2203/5454* (2013.01); *H04W 84/12* (2013.01); *Y02D 30/70* (2020.08)

(58) Field of Classification Search
CPC ....... H04W 4/80; H04W 52/02; H04W 84/12; G05F 1/12; H04B 3/54; H04B 2203/5441; H04B 2203/5454; Y02D 30/70
USPC .......................... 375/257; 455/67.11; 702/62
See application file for complete search history.

(56) References Cited

U.S. PATENT DOCUMENTS

| | | |
|---|---|---|
| 4,942,386 A | 7/1990 | Willis |
| 5,710,545 A | 1/1998 | Dunn |
| 5,769,527 A | 6/1998 | Taylor et al. |
| 5,841,428 A | 11/1998 | Jaeger et al. |

(Continued)

FOREIGN PATENT DOCUMENTS

CN 203099410 U 7/2013

*Primary Examiner* — Fitwi Y Hailegiorgis
(74) *Attorney, Agent, or Firm* — Jeffrey Schox; Diana Lin

(57) ABSTRACT

A power outlet for controlling power to an external device and transmitting data to the external device, the power outlet including: a housing containing at least one alternating-current power input connection; a power output connection; a data connector; a sensor module; a wireless communication module, including an antenna; a processing unit configured to receive data and control an electrically connected device through the power output connection and/or data connector based on the received data.

16 Claims, 7 Drawing Sheets

(56) References Cited

U.S. PATENT DOCUMENTS

| | | |
|---|---|---|
| 5,914,669 A | 6/1999 | Wicks et al. |
| 6,003,206 A | 12/1999 | Hall et al. |
| 6,624,368 B2 | 9/2003 | Sato et al. |
| 6,726,112 B1 | 4/2004 | Ho |
| 6,759,966 B1 | 7/2004 | Weng |
| 7,103,460 B1 | 9/2006 | Breed |
| 7,205,495 B2 | 4/2007 | Mazur |
| 7,339,128 B2 | 3/2008 | Yen |
| 7,418,392 B1 | 8/2008 | Mozer et al. |
| 7,446,671 B2 | 11/2008 | Giannopoulos et al. |
| 7,474,632 B2 | 1/2009 | Ban |
| 7,573,208 B2 | 8/2009 | Newman |
| 7,598,885 B2 | 10/2009 | Kwon et al. |
| 7,667,163 B2 | 2/2010 | Ashworth et al. |
| 7,859,398 B2 | 12/2010 | Davidson et al. |
| 7,884,556 B2 | 2/2011 | Gandhi |
| 7,952,322 B2 | 5/2011 | Partovi et al. |
| 7,980,726 B2 | 7/2011 | Joosen et al. |
| 8,035,320 B2 | 10/2011 | Sibert |
| 8,100,552 B2 | 1/2012 | Spero |
| 8,115,369 B2 | 2/2012 | Kang et al. |
| 8,160,514 B2 | 4/2012 | Aparin et al. |
| 8,195,313 B1 | 6/2012 | Fadell et al. |
| 8,207,821 B2 | 6/2012 | Roberge et al. |
| 8,253,344 B2 | 8/2012 | Guest et al. |
| 8,282,250 B1 | 10/2012 | Dassanayake et al. |
| 8,294,379 B2 | 10/2012 | Liu et al. |
| 8,299,719 B1 | 10/2012 | Moshirnoroozi |
| 8,314,566 B2 | 11/2012 | Steele et al. |
| 8,373,360 B2 | 2/2013 | Leung et al. |
| 8,433,530 B2 | 4/2013 | Shimada et al. |
| 8,446,288 B2 | 5/2013 | Mizushima et al. |
| 8,523,410 B2 | 9/2013 | Hashimoto et al. |
| 8,562,158 B2 | 10/2013 | Chien |
| 8,581,512 B2 | 11/2013 | Hamamoto et al. |
| 8,593,073 B2 | 11/2013 | Aldrich et al. |
| 8,723,794 B2 | 5/2014 | Corson et al. |
| 8,742,694 B2 | 6/2014 | Bora et al. |
| 8,743,023 B2 | 6/2014 | Maxik et al. |
| 8,755,561 B2 | 6/2014 | Vlutters et al. |
| 8,760,370 B2 | 6/2014 | Maxik et al. |
| 8,760,514 B2 | 6/2014 | Chien |
| 8,764,251 B2 | 7/2014 | Lien |
| 8,788,966 B2 | 7/2014 | Josephson et al. |
| 8,812,827 B2 | 8/2014 | Malasani |
| 8,820,984 B2 | 9/2014 | Gillio |
| 8,829,799 B2 | 9/2014 | Recker et al. |
| 8,858,029 B2 | 10/2014 | Brandes et al. |
| 8,888,306 B2 | 11/2014 | Thomas et al. |
| 8,890,435 B2 | 11/2014 | Bora et al. |
| 8,902,049 B2 | 12/2014 | Fushimi et al. |
| 8,981,913 B2 | 3/2015 | Henig et al. |
| 8,994,276 B2 | 3/2015 | Recker et al. |
| 9,030,120 B2 | 5/2015 | Pickard et al. |
| 9,049,756 B2 | 6/2015 | Klusmann et al. |
| 9,074,736 B2 | 7/2015 | Recker et al. |
| 9,113,528 B2 | 8/2015 | Bora et al. |
| 9,192,032 B2 | 11/2015 | Kwag et al. |
| 9,247,625 B2 | 1/2016 | Recker et al. |
| 9,252,595 B2 | 2/2016 | Recker et al. |
| 9,526,151 B2 | 12/2016 | Kreiner et al. |
| 9,538,619 B2 | 1/2017 | Swatsky et al. |
| 9,578,722 B2 | 2/2017 | Feng et al. |
| 9,768,831 B2 | 9/2017 | Bosua et al. |
| 2004/0105264 A1 | 6/2004 | Spero |
| 2005/0272372 A1 | 12/2005 | Rodriguez |
| 2005/0285547 A1 | 12/2005 | Piepgras et al. |
| 2007/0145915 A1 | 6/2007 | Roberge et al. |
| 2007/0182367 A1 | 8/2007 | Partovi |
| 2008/0218099 A1 | 9/2008 | Newman |
| 2009/0251127 A1 | 10/2009 | Kim |
| 2009/0295310 A1 | 12/2009 | Duerr et al. |
| 2010/0068899 A1 | 3/2010 | Shvili |
| 2010/0167659 A1* | 7/2010 | Wagner ............... G01R 22/061 455/67.11 |
| 2010/0194687 A1 | 8/2010 | Corson et al. |
| 2010/0250161 A1* | 9/2010 | Wang .................... G07C 3/02 702/62 |
| 2010/0296285 A1 | 11/2010 | Chemel et al. |
| 2011/0050120 A1 | 3/2011 | Leung et al. |
| 2011/0072293 A1* | 3/2011 | Mazzaferri ........... G06F 1/3203 713/340 |
| 2011/0089838 A1 | 4/2011 | Pickard et al. |
| 2011/0109216 A1 | 5/2011 | Kang et al. |
| 2011/0163683 A1 | 7/2011 | Steele et al. |
| 2011/0234366 A1 | 9/2011 | Feng et al. |
| 2011/0285515 A1 | 11/2011 | Fushimi et al. |
| 2011/0309769 A1 | 12/2011 | Kuroki et al. |
| 2012/0025717 A1 | 2/2012 | Klusmann et al. |
| 2012/0026726 A1 | 2/2012 | Recker et al. |
| 2012/0080944 A1 | 4/2012 | Recker et al. |
| 2012/0126699 A1 | 5/2012 | Zittel |
| 2012/0195053 A1 | 8/2012 | Wu |
| 2012/0206050 A1 | 8/2012 | Spero |
| 2012/0300441 A1 | 11/2012 | Thomas et al. |
| 2013/0038230 A1 | 2/2013 | Brown et al. |
| 2013/0063042 A1 | 3/2013 | Bora et al. |
| 2013/0148341 A1 | 6/2013 | Williams |
| 2013/0193847 A1 | 8/2013 | Recker et al. |
| 2013/0257312 A1 | 10/2013 | Maxik et al. |
| 2013/0278172 A1 | 10/2013 | Maxik et al. |
| 2014/0043825 A1 | 2/2014 | Brandes et al. |
| 2014/0084809 A1 | 3/2014 | Catalano |
| 2014/0117859 A1 | 5/2014 | Swatsky et al. |
| 2014/0239811 A1 | 8/2014 | Kreiner et al. |
| 2014/0285999 A1 | 9/2014 | Luna et al. |
| 2014/0300293 A1 | 10/2014 | Ruan et al. |
| 2015/0015165 A1 | 1/2015 | Engelen et al. |
| 2015/0048760 A1 | 2/2015 | Kwag et al. |
| 2015/0084513 A1 | 3/2015 | Anthony et al. |
| 2015/0141755 A1 | 5/2015 | Tesar |
| 2015/0189721 A1 | 7/2015 | Karc et al. |
| 2015/0208900 A1 | 7/2015 | Vidas et al. |
| 2016/0100086 A1 | 4/2016 | Chien |

* cited by examiner

POWER OUTLET AND METHOD FOR USE

CROSS-REFERENCE TO RELATED APPLICATIONS

This application is a continuation of U.S. application Ser. No. 16/290,720, filed 1 Mar. 2019, which is a continuation of U.S. application Ser. No. 16/163,087, filed 17 Oct. 2018, which is a continuation of U.S. application Ser. No. 15/681, 797, filed 21 Aug. 2017, which is a continuation of Ser. No. 15/477,251, filed 3 Apr. 2017, which is a divisional of U.S. application Ser. No. 14/843,773, filed 2 Sep. 2015, which claims the benefit of U.S. Provisional Application No. 62/044,788, filed 2 Sep. 2014 and 62/164,946, filed 21 May 2015, which are incorporated in their entireties by this reference.

This application is related to U.S. application Ser. No. 14/512,669, filed 13 Oct. 2014, Ser. No. 14/542,312, filed 14 Nov. 2014, Ser. No. 14/720,180, filed 22 May 2015, and Ser. No. 14/793,375, filed 7 Jul. 2015, which are incorporated in their entireties by this reference.

TECHNICAL FIELD

This invention relates generally to the connected devices field, and more specifically to a new and useful connected power outlet in the connected devices field.

BACKGROUND

Recently, there has been a trend toward incorporating long-range, wireless communication modules into components that conventionally lack wireless connectivity or any data input at all (un-connected components). However, wireless communication modules, particularly long-range wireless communication modules (e.g., WiFi chips), tend to be expensive. Inclusion of such chips can drastically increase the cost of these conventional systems.

Thus, there is a need in the devices field to create a new and useful system and method of introducing long-range wireless communication capabilities into un-connected devices. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Power Outlet

Figure 1:
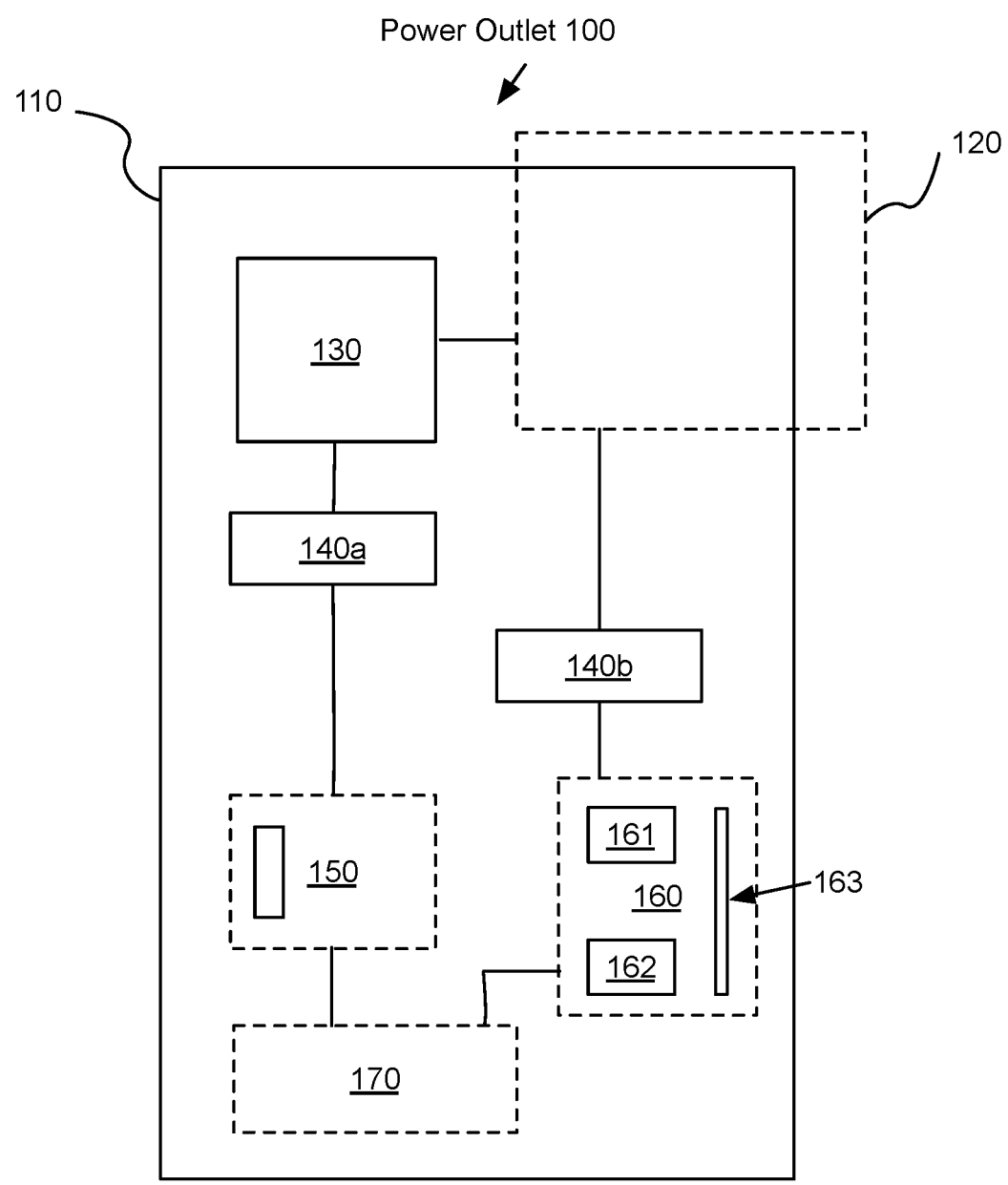
FIG. 1 is a schematic representation of a connectivity-enabled power outlet.
Figure 2:
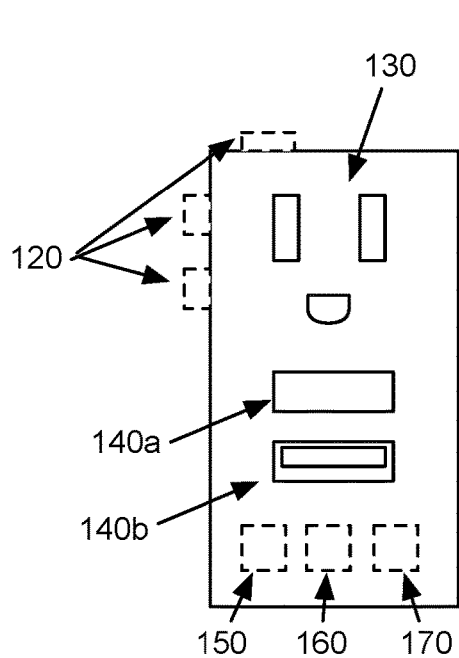
FIG. 2 is a schematic representation of a first variation of the power outlet.
Figure 3:
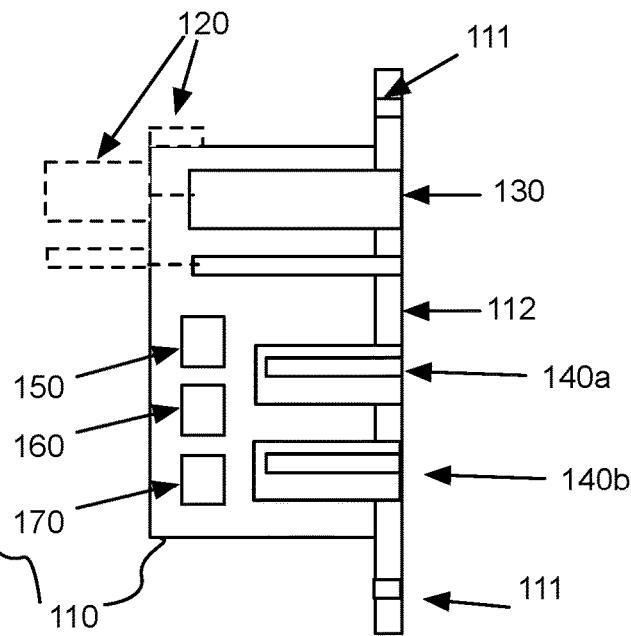
FIG. 3 is a section view of the first variation of the power outlet.

As shown in FIG. 1, the power outlet 100 includes a housing 110, a power input connection 120, a power output connection 130, a data connector 140*a*, an input/output module 150, a communication module 160, and a processing unit 170. The power outlet 100 can additionally include a combined power data connector 140*b*, one or more sets of sensors, memory, a power management circuit, a set of electromagnetic signal emitting elements (e.g., lighting elements), or a plurality of any of these components. The power outlet 100 functions to power a connected external device and provide data transfer capability between the connected external device and a remote device, such as a set of servers or personal mobile device. The power outlet 100 can additionally function to network a set of external devices, each connected to an outlet 100 in a set of outlets, wherein the outlets can be wired or wirelessly connected to act as network nodes. The power outlet 100 can additionally function to enable remote control of a connected external device, by sending control data to the connected external device or controlling the power delivered to the connected device.

The inventors have discovered that connectivity can be introduced to unconnected components (devices) without increasing the component's cost. These unconnected components are typically powered, and are either periodically or substantially constantly plugged into a power outlet, but lack an inherent means for data communication with other unconnected or remote devices on a network. Furthermore, the power connection to these components oftentimes doubles as a data connection. The inventors have discovered that, by incorporating connectivity into the power outlet 100 and enabling data communication between the outlet 100 and the unconnected component, these previously unconnected components can leverage the communication module 160 of the power outlet 100 to communicate with remote devices, thereby introducing long-range wireless communication capabilities without incorporating a dedicated wireless communication module 160 into the component. By incorporating a processing unit 170 into the power outlet 100 that can be used in conjunction with the communication module 160, the inventors have discovered that many signal processing and data transfer tasks that would increase the cost and complexity of an otherwise unconnected component can instead be performed by the power outlet 100. Other benefits of the invention include the capability to manage the power that is provided to the connected component, device, or accessory.

1.1 Housing

The housing 110 of the power outlet 100 functions to contain the electrical and mechanical components and subsystems as well as to provide a substrate on which to affix sub-components, mounting fixtures, and various apertures. The housing 110 is preferably rigid, but alternatively can be flexible, contain flexible portions, be semi-rigid, or have any other suitable degree of rigidity. The housing 110 can alternatively be composed of multiple rigid portions that articulate relative to one another. The housing 110 preferably has high thermal conductivity, but can alternatively have low thermal conductivity or any other suitable conductivity. The housing 110 preferably is of low electrical conductivity and acts substantially as an electrical insulator, but alternatively can be semi-conductive or conductive. The housing 110 preferably includes one or more apertures in for mounting the housing 110 to a surface or surfaces, but can alternatively mount to a surface using magnetic attraction, adhesive, clips, or any other suitable mechanism for attachment. The housing 110 preferably includes one or more removable panels which provide access to any components or structures contained within the housing 110, but alternatively the housing 110 can be partially open, fully sealed, include expandable orifices, or any other suitable means for accessing the interior of the housing 110. The housing 110 also preferably includes one or more orifices for the insertion and removable attachment of plugs corresponding to one or more power connectors 120, 130, data connectors 140*a*, or connectors 140*b* that transmit both power and data (power-data connectors 140*b*). The housing 110 is preferably substantially a rectangular prism which encloses an internal volume, but can alternatively be ovoid, cubic, or any other suitable shape providing an internal volume and defining one or more external broad faces. The housing 110 can also include one or more protruding substructures to provide mounting flanges, orifices, or any other suitable mounting substructures. The housing 110 is preferably constructed substantially of plastic, but can alternatively be metal, wood, or any suitable combination of suitable materials. The housing 110 is preferably assembled from multiple rigid substructures using screws or other fasteners, but can alternatively be bonded together with adhesive, cast from a single piece, or any other suitable means for assembly, attachment, or construction.

In one variant of the invention, the housing 110 is constructed to mount within a wall in place of a conventional electrical power outlet. In this variation, the housing 110 preferably contains two protruding substructures, each of which contains one or more mounting orifices 111, which together provide an incorporated mounting bracket for attachment to the interior of a wall outlet substructure. The housing 110 can also contain a faceplate 112, which can be removably attached with screws or other fasteners, that covers the interior of the housing 110 and provides orifices for various plugs, connectors, and cables. The housing 110 can be mounted entirely within, partially within, on the wall, or in any other suitable location.

In another variant of the invention, the housing 110 is configured to mount over an existing electrical power outlet. In this variation, the housing 110 preferably provides one or more three-prong protrusions configured to fit into a typical three-orifice female electrical power socket. These protrusions are preferably made of metal or another conductive material, but alternatively can be electrical insulators or semi-conductors.

Figure 4:
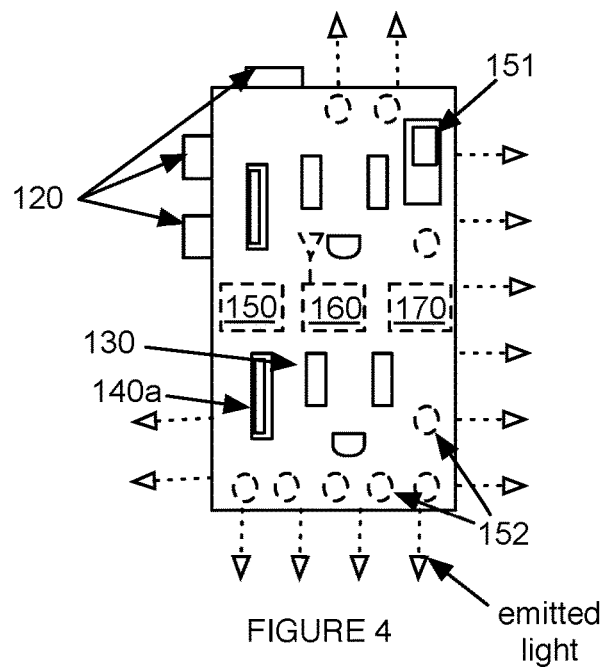
FIG. 4 is a schematic representation of a second variation of the power outlet.
Figure 5:
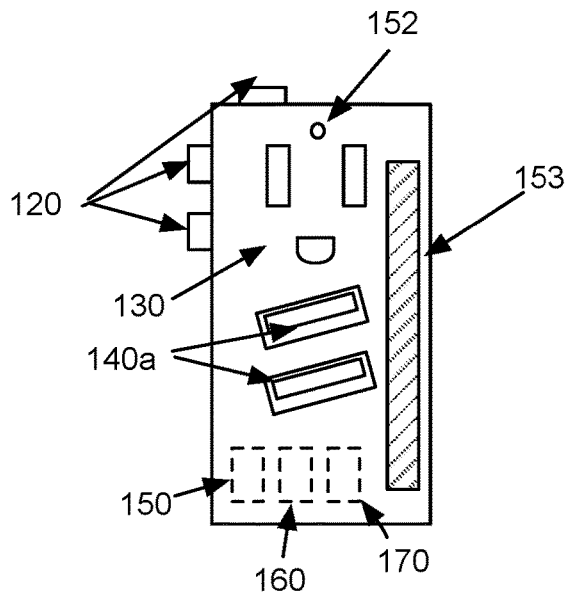
FIG. 5 is a schematic representation of a third variation of the power outlet.

In a further variant of the invention, the housing 110 is connected to a power source via a substantially flexible cable or cord that is connected to the housing 110 and passes through an orifice in the housing 110. The housing 110 of this and all other variants of the invention can include one or more light-emitters 152, which are preferably located on the outer surface of the housing 110. Alternatively, light-emitters 152 can be embedded in the housing 110 (e.g., along the perimeter of the housing 110, along the edge of the housing 110 proximal the faceplate, along the exterior side of the housing 110, etc.) or be located in any other suitable location. The light-emitters 152 are preferably arranged about the entirety of the housing periphery, but can alternatively be arranged along a portion of the housing periphery (e.g., along one sides, along opposing sides, along adjacent sides, etc.), along the housing face, or along any other suitable portion of the housing 110. The light-emitters 152 are preferably arranged with an active surface arranged with a normal vector opposing the housing 110 interior (e.g., directed outward) as shown in FIG. 4, but can alternatively be arranged at an angle or at any other suitable orientation. The light-emitters 152 can be LEDS, OLEDS, or be any other suitable element capable of emitting visible or invisible light. Examples of light that can be emitted include white light, colored light (e.g., RGB, wherein the LED is an RGB LED), IR, or any other suitable color. The light-emitters 152 can be operated in response to or concurrently with data receipt, power receipt, lighting control instruction receipt, data transfer (e.g., device control), power supply through the power output connectors 130, power supply cessation, the occurrence of a trigger event (e.g., a time of day being met, a proximity sensor detecting a proximal user), or be controlled in any other suitable manner.

1.2 Power Input Connector

The power outlet 100 includes a power input connector 120 (power input connection 120), which functions to supply power to the power outlet 100 for provision to a connected external device. The power input connector 120 is preferably capable of conducting alternating current through a first and second electrode, but can alternatively be capable of conducting direct-current or an arbitrary current waveform. The power input connector 120 preferably includes a third electrode for an earth-ground connection, but alternatively the housing 110 can constitute an earth-ground connection, either the first or second electrode can be an earth-ground connection, or an earth-ground connection can be absent. The power input connector 120 preferably includes screw terminals to retain the power input wires or connection, but can alternatively include a standard female wall outlet plug arrangement, solder points, electrically conductive clips, or any other suitable method for retaining the electrical connection between the power input connector 120 and a source of electrical power. The screw terminals are preferably located in disparate locations on the housing 110, but can alternatively be in any suitable geometric arrangement. The power input connector 120 can be a female plug in the typical electrical outlet configuration (e.g., NEMA 1-15 (Type A), NEMA5-15 (Type B)), but alternatively can be a male plug in the typical electrical outlet configuration, or a male or female plug in any other suitable configuration. The power input connector 120 is preferably constructed of a combination of electrically conductive and electrically insulating material configured to permit power to flow into the power outlet 100 without short-circuiting. Preferably, the power input connector 120 and associated orifices are embedded in the housing 110, but can alternatively be connected via a cord, on top of the housing 110, entirely enclosed by the housing 110, or be in any other suitable location.

In a first embodiment, the power input connection 120 is a set of screw terminals located on the exterior of the housing 110, wherein the positive, common, and ground wires in a building electrical wiring system are each connected to a different screw terminal. These screw terminals are electrically isolated from one another.

In a second variation, the power input connection 120 is a standard NEMA 5-15 male plug that can be inserted into a standard grounded NEMA5-15 wall outlet. This plug can be coupled to the power outlet 100 via an extended, flexible cord, or can be rigidly affixed directly to the exterior of the housing 110.

In alternative variations, the power input connector 120 can be a direct-current input, a wireless power input module, or any other suitable means to receive power at the power outlet 100.

1.3 Power Output Connector

The power outlet 100 includes one or more power output connectors 130 (power output connections 130) that function to removably couple one or more external devices to the power outlet 100 and to supply electrical power to them. The power output connectors 130 are preferably configured as standard female alternating current electrical sockets (e.g., NEMA5-15), but can alternatively be male plugs, direct-current ports, a wireless-power transmitter, or any other suitable connector for conveying electrical power. The power output connectors 130 are preferably recessed into the housing 110 to prevent short circuits, but can alternatively be flush with or extended outward from the surface of the housing 110. The power output connectors 130 are preferably oriented to face outward from the housing 110 to enable convenient removable attachment of external devices, but can alternatively be located beneath a movable cover, be affixed to flexible extension cables, or any other suitable orientation relative to the housing 110.

In a variation of the invention, the power output connector 130 is a USB plug configured to supply direct-current (DC) power to a connected external device. In an alternative variation, the power output connector 130 is a D-subminiature (D-sub) cable with one or more pins configured to supply electrical power. In another variation, there is a set of power output connectors 130 of one or more types, wherein the type of output connector 130 can vary over the set.

1.4 Data Connector

The power outlet 100 includes one or more data connectors 140a that function to allow data communication with a connected external device. The data communication can be two-way, one-way (e.g., to the device, from the device), or enable communication in any suitable direction between any suitable number of endpoints. The data connectors 140a are preferably female sockets for physical connection of one or more pins, but can alternatively be male plugs, extended cables with male or female ends, or a combination of male or female plugs with male or female pins. The data connectors 140a are preferably USB ports, but can alternatively be HDMI, VGA, RS-232, analog signal, or any other suitable data connection. The data connectors 140a preferably constitute a physical electrical connection, but alternatively can constitute an optical infrared link, Wi-Fi radio, radiofrequency transceiver, millimeter-wave transceiver, or any other suitable wireless data transfer mechanism.

1.5 Input-Output Module

The power outlet 100 includes an input-output (I/O) module 150, which functions to collect contextual data from the environment local to the power outlet 100 and provide visible, aural, haptic, or other suitable feedback to the local environment. Contextual data can include data from a sensor 153 or data from a data input mechanism 151. A sensor 153 could be a temperature sensor, a noise or sound sensor, a light sensor, an infrared tripwire sensor, a motion sensor, a touch sensor, a camera, an orientation sensor, a location sensor, a position sensor, a proximity sensor, a pressure sensor, an optical sensor, a current sensor, a voltage sensor, an electromagnetic sensor, or any other suitable type of sensor. A data input mechanism 151 could include a mechanical switch 151 as shown in FIG. 4, a keypad, a touch screen, a pushbutton, a microphone, a video camera, a radio, or any other suitable type of data input mechanism. Providing feedback to the local environment can include generating an audible tone, turning LEDs on and off, vibrating the housing 110, broadcasting a radio signal, or any other suitable form of feedback. The I/O module 150 preferably contains one or more of the aforementioned sensors, data input mechanisms, and feedback mechanisms, along with supporting electronic components to ensure proper operation of the sensors, data input mechanisms, and/or feedback mechanisms.

1.6 Communication Module

The power outlet 100 includes a communication module 160, which functions to enable and conduct data transfer between the power outlet 100 and external devices. The communication module 160 can differ from the data connector 140a in that it is preferably configured for wireless communication, but can alternatively be configured for wired data transfer. The communication module 160 preferably includes an antenna 163, a transmitter 161, and a receiver 162. The antenna 163 is preferably contained within the housing 110, but can alternatively extend outward from the housing 110 or be contained within a portion of the housing 110 that protrudes outwards from the remainder of the housing 110. The transmitter 161 and receiver 162 are both preferably contained in the housing 110, but can alternatively be only partially within the housing 110, or one or the other can be absent. The communication module 160 can share the same electrical ground as the power output connector 130 or be grounded to a separate electrical ground. Variants of the communication module 160 can include a near-field communication (NFC) module, Bluetooth low energy (BLE) module, BLE beacon, WiMAX radio, Zigbee radio, or any other suitable short or long range repeater, extender, protocol translator, or other suitable means for conducting a one-way or two-way communication protocol. The outlet can include one or more communication modules. In variants including multiple communication modules (e.g., such that the outlet is a multiradio system), each communication module can be substantially similar (e.g., run the same protocol), or be different. In a specific example, a first communication module can communicate with a remote router, while a second communication module functions as a border router for devices within a predetermined connection distance. The multiple communication modules can operate independently and/or be incapable of communicating with other communication modules of the same outlet, or can operate based on another communication module of the outlet (e.g., based on the operation state of, information communicated by, or other operation-associated variable of a second communication module). However, the outlet can include any suitable number of communication modules connected and/or associated in any other suitable manner.

In a particular embodiment, the communication module 160 is configured to communicate via a Wi-Fi wireless protocol. In this embodiment, the communication module 160 includes a Wi-Fi radio transceiver and associated sub-components and is located within the housing 110, the housing 110 being made of material that is at least partially transparent to the radio waves emitted and received by the Wi-Fi radio.

In another particular embodiment, the communication module 160 is configured to send and receive information via a modulated power line signal. In this embodiment, the communication module 160 is coupled to the power input connection 120 and is configured to send information over the power input connection 120 by using the line current waveform as a carrier waveform and modulating this waveform, and to interpret information sent to the communication module 160 via the power input connection 120 in a like manner. Alternatively, the communication module 160 can be capable of sending information only via power line modulation, and receiving information through any other suitable means, or vice versa.

1.7 Processing Unit

The power outlet 100 includes a processing unit 170 that functions to process any received data, generate instructions for subsequent transmission, direct data transmission, and control all subsystems of the power outlet 100. The processing unit 170 is preferably electrically connected to each of the subsystems, but can additionally or alternatively be wirelessly connected to the subsystems, or otherwise connected to the subsystems. These subsystems can include the communication module 160, the I/O module 150, the power output connectors 130, the power input connectors 120, and any of the sub-components thereof. The processing unit 170 is preferably a microprocessor, but can alternatively be a central processing unit (CPU), a graphical processing unit (GPU), or any other suitable means of executing computational tasks.

2. Method for Connecting Devices

Figure 6:
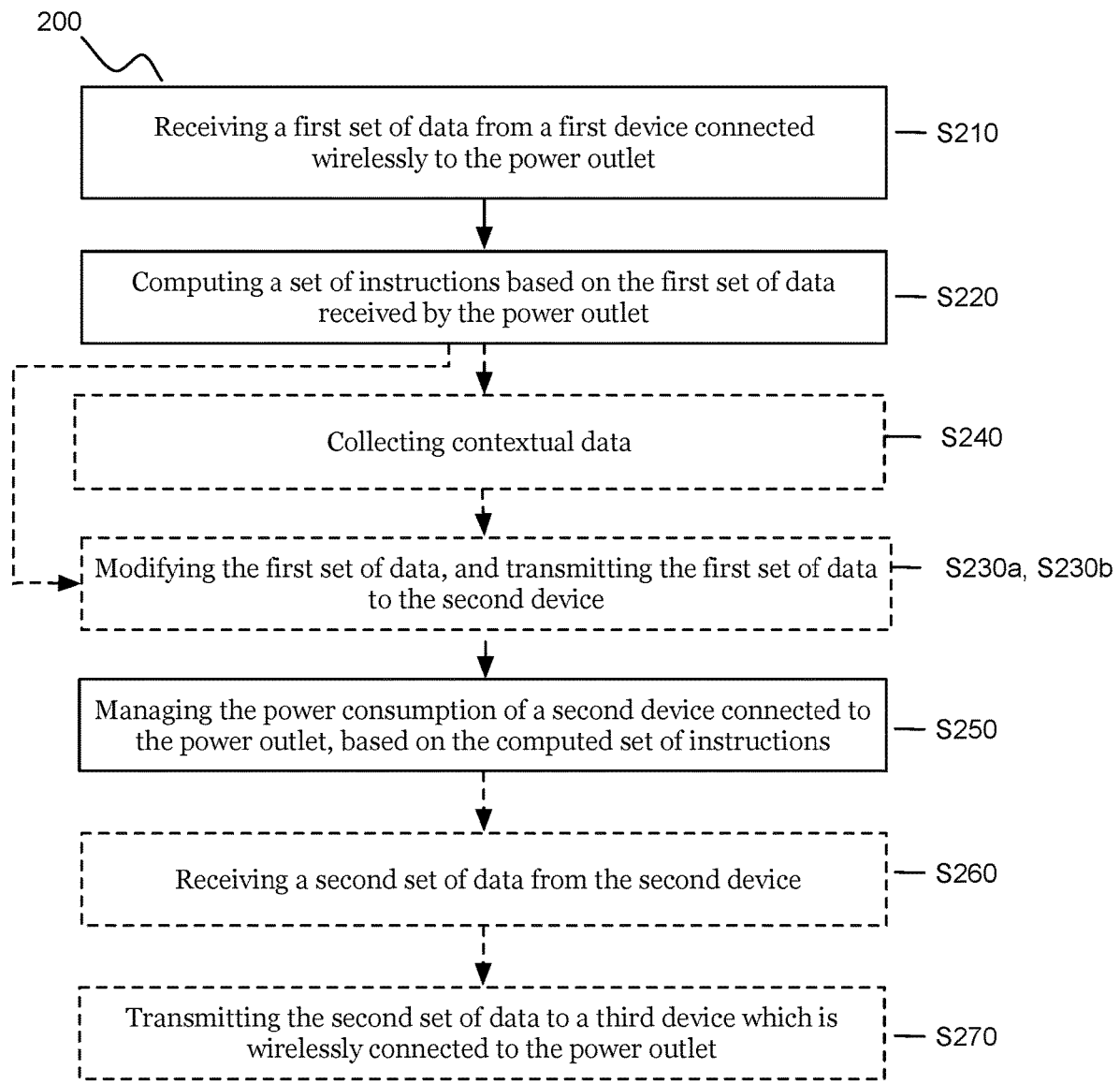
FIG. 6 is a schematic representation of a method of data transfer between a remote device and an accessory via an outlet.
Figure 7:
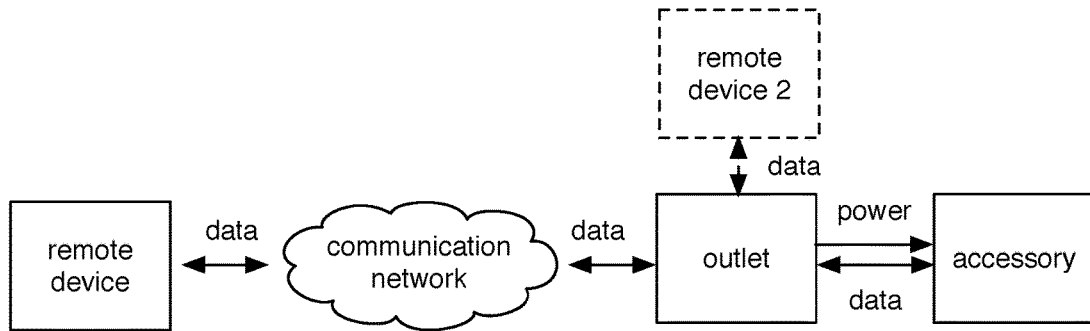
FIG. 7 is a schematic representation of a first variation of the method.
Figure 8:
FIG. 8 is a schematic representation of an example of audio-video streaming from a device, through a set of networked outlets, to an A/V output, such as a display.
Figure 9:
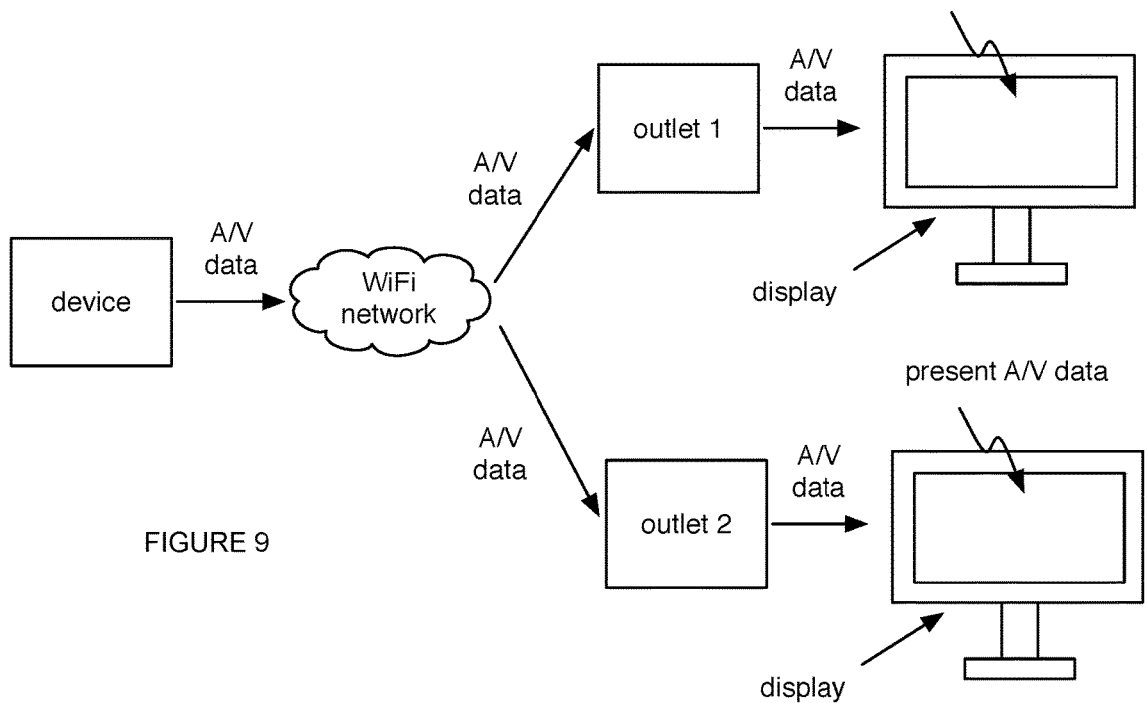
FIG. 9 is a schematic representation of an example of synchronous audio-video display, wherein the audio-video data is streamed from a device, through a set of networked outlets, to a set of A/V outputs.
Figure 10:
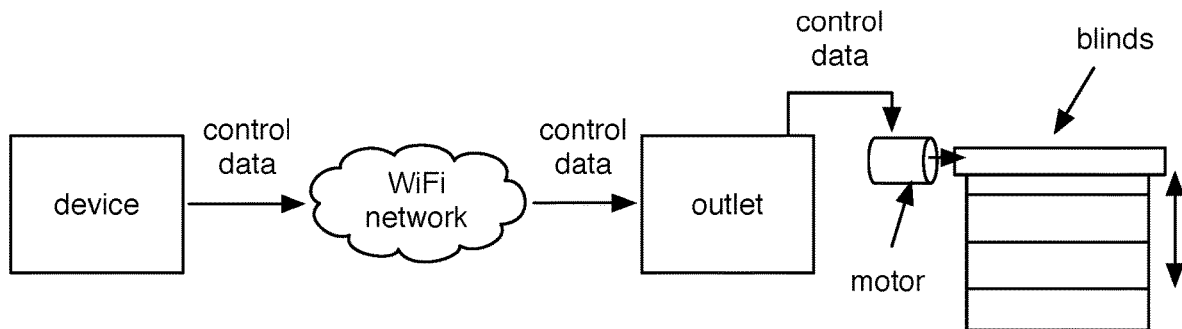
FIG. 10 is a schematic representation of an example of remote device control of a motorized accessory (e.g., a set of blinds) through the outlet.
Figure 11:
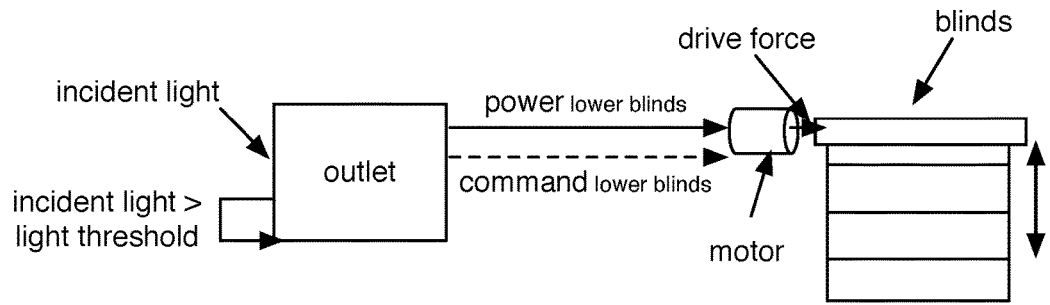
FIG. 11 is a schematic representation of an example of automated control of a motorized accessory by the outlet, based on the ambient environment measurement.
Figure 12:
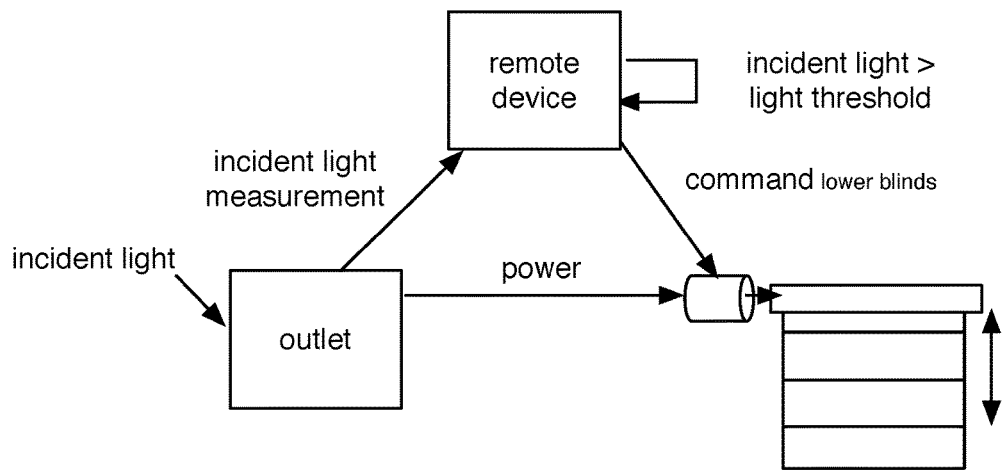
FIG. 12 is a schematic representation of an example of remote device control of a motorized accessory by a remote device, based on based on the ambient environment measurement from the outlet.
Figure 13:
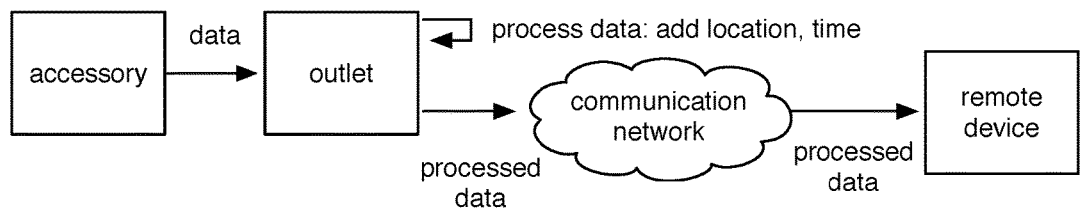
FIG. 13 is a schematic representation of an example of outlet data processing, wherein the outlet can add metadata such as location or time to the data communicated by the accessory.
Figure 15:
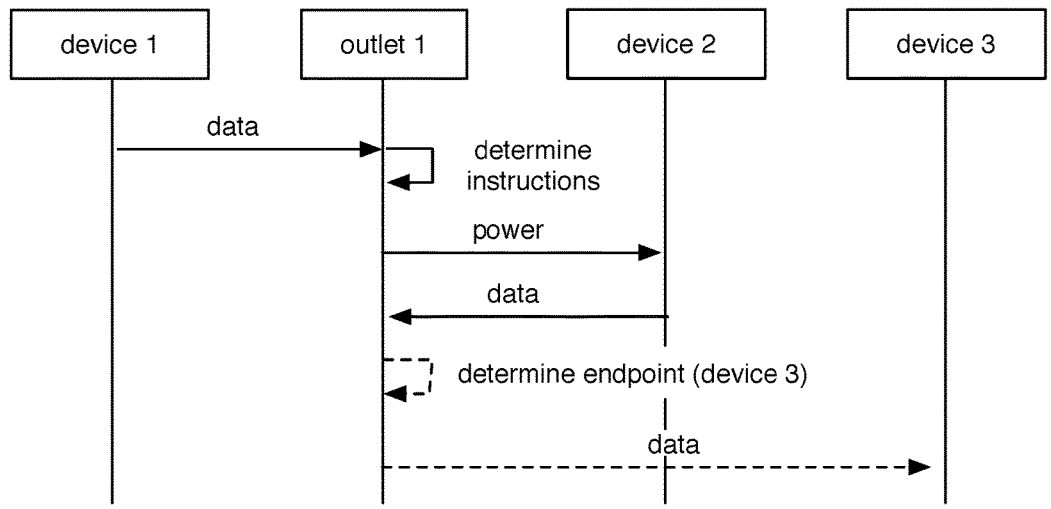
FIG. 15 is a schematic representation of a second example of the method, including receiving data from a device at a first outlet, determining instructions based on the data, managing power provision to an electrically connected second device based on the instructions, and receiving data from the second device.

As shown in FIG. 6, the method 200 functions to connect multiple external devices and manages the power provided to one or more of the connected external devices. The method 200 includes: receiving a first set of data from a first connected device S210; determining a set of instructions S220 based on the first set of data; and managing the power consumption S250 of a second connected device. The method 200 can optionally include: receiving a second set of data S260 from the second connected external device; and transmitting the second set of data S270 to a third connected device (e.g., as shown in FIG. 15). The method 200 can additionally optionally include: collecting contextual data S240; modifying the first or second set of data S230a; storing the first or second set of data; computing a pattern from the first or second set of data; receiving a third set of data; identifying one or more of the connected external devices or generating or producing device identification data; sending a set of data to the second connected device, or computing one or more sets of instructions.

The method 200 is preferably performed by a system incorporating one or more of the power outlets described above, but could alternatively be performed by any system configured to perform substantially similar functions.

This method 200 for connecting devices to a network and controlling them via a connectivity-enabled power outlet 100 confers a host of benefits on a practitioner of the method 200. The method 200 enables local (contextual) data to be incorporated into control schemes for connected devices without the added cost and complexity of adding dedicated sensors to those connected devices. It also allows for remote power management of electrically controlled devices, and for the management to incorporate two-way data streams originating from the controlled device or additional contextual data sources. The method 200 enables data transfer between two devices connected to two respective connectivity-enabled power outlets on a peer-to-peer network or data stream, particularly if the two devices would otherwise lack the capability for such data transfer.

Device (external device, connected device) can be another physical instance of the power outlet system 100 described above, such that the plurality of power outlets act as nodes in a data transfer network. Alternatively, device can refer to a mobile phone, a laptop, a desktop computer, a remote server, an audio-visual receiver, a television, a monitor, a camera, a music player, a speaker, a connected lighting system, a connected switch, or any other device suitable for data generation, transmission, reception, or display. As a further alternative, device can refer to any electrically-powered device over which power management and control is desired, such as a light bulb, lamp, radio, refrigerator, washing machine, dryer, air-purification system, air conditioner, or any other suitable electrically-powered device. These devices can be in the local vicinity of the power outlet 100 (e.g., in the same room), located in the proximate area of the power outlet 100 (e.g., in the same building), or be located remotely away from the power outlet 100 (e.g., a remote server in a different country).

In the context of the method 200, data (e.g., received data, set of data, contextual data) can refer to a command sent to the power outlet 100 from a wirelessly connected device. Alternatively, data can refer to audio data, video data, audio-visual data, record information, preferences, timing information, clock synchronization data, or any other necessary form of transmittable data sent to the power outlet 100 from a wired or wirelessly connected external device. Contextual data is preferably data acquired via the power outlet 100 through one or more incorporated sensors or data input mechanisms, but can alternatively be other data inherent to the spatiotemporal surroundings of the power outlet 100, such as the current time, position, locally stored data, or data transmitted to the power outlet 100 by a connected device.

2.1 Receiving a First Set of Data

Receiving a first set of data S210 from a first connected device functions to obtain information from the first connected device. S210 is preferably performed over a wireless connection between the power outlet 100 and the first connected device by the power outlet's communication module 160, but can alternatively be performed via a wired connection. Receiving a first set of data S210 can include receiving serial data, analog data, parallel data streams, or any other suitable type of data organization and reception. The received data can be sent from the first connected device, or it can be sent from any other connected device, collected from the I/O module 150 of the power outlet 100, generated spontaneously by the power outlet 100, or received from any other suitable origin. The first set of data can also include data received from a plurality of connected devices and combined into the first set of data, which can then be used in other parts of the method 200 as a single set of data.

2.2 Determining a Set of Instructions

Determining a set of instructions (computing a set of instructions) S220 based on the first set of data functions to interpret the first set of data and generate a subsequent set of commands and parameters to inform other processes of the method 200. S220 is preferably performed by the power outlet's 100 processing unit 170, but can alternatively be performed by a remotely connected processor (e.g., a remote server, a wirelessly connected mobile phone, or a computer connected via a USB cable). Determining a set of instructions based on the first set of data preferably occurs after receiving the first set of data, but can also be performed concurrently. The determined set of instructions can include instructions to turn on a device, turn off a device, reduce power delivered to a device, increase power delivered to a device, modulate the power delivered to a device, collect data from a device, operate a device between high and low power states, or any other suitable set of instructions. Instructions can also include power management instructions, device operation instructions, outlet operation instructions (e.g., controlling the operation of light-emitters 152 coupled to the housing 110 of the power outlet Dm), or any other suitable instructions. Determining a set of instructions S220 can include packaging or repackaging data, translating data, interpreting data, computing on data, or generating a set of instructions based on data transformed in any of the aforementioned ways. The first set of data can be a predetermined set of instructions, wherein determining a set of instructions S220 includes retransmitting the received first set of data, which is a set of instructions. Determining a set of instructions S220 can optionally include receiving contextual data S240 as described above and combining the received first set of data with received contextual data in order to determine a set of instructions. For example, receiving a first set of data S210 can include detecting that a user or user device (e.g., a mobile phone) is within a house based on a user or user device connection to a local network (e.g., wherein the power outlet 100 is also connected to the local network); receiving (collecting) contextual data S240 can include measuring the ambient temperature; and determining a set of instructions S220 can include combining ambient temperature data with the detection of a user or user device to instruct an air conditioner wirelessly or directly connected to the power outlet 100 to turn on. Alternatively or additionally, determining a set of instructions S220 can include determining an endpoint address for sending the first set of data or a transformed set of data based on the received first set of data.

2.3 Managing Power Consumption

Managing the power consumption S250 of a second connected device functions to alter or maintain the behavior of the second device by altering or maintaining the degree and manner in which power is provided to the second device, based on the set of instructions. S250 is preferably performed by the power outlet's 100 processing unit 170 in conjunction with the power input connection 120 and power output connection 130, but can alternatively be performed by a separate means for power regulation as a result of the determined set of instructions. Preferably, S250 is performed subsequent to determination of the set of instructions, but can alternatively be performed concurrently or prior. Managing the power consumption S250 can include conditioning the input power, regulating the voltage, regulating the current, engaging a current or voltage transformer, detecting the load impedance of the second device, and delivering a variable amount of power to the second device. Managing the power consumption S250 can alternatively include maintaining the existing degree and type of power provision to the connected device, as a result of the determined set of instructions. Managing the power consumption S250 is preferably performed by clipping the alternating current waveform to reduce the average provided power, but can alternatively be performed by pulse-width modulating a direct current waveform, increasing or decreasing the amplitude of the provided current, altering the amplitude of the provided current in a linear, logarithmic, or exponential fashion, leaving the provided power unchanged, initiating or discontinuing the provided power, operating the device between a high and a low power state, or any other suitable manner of managing the provided power based on the determined set of instructions.

Figure 16:
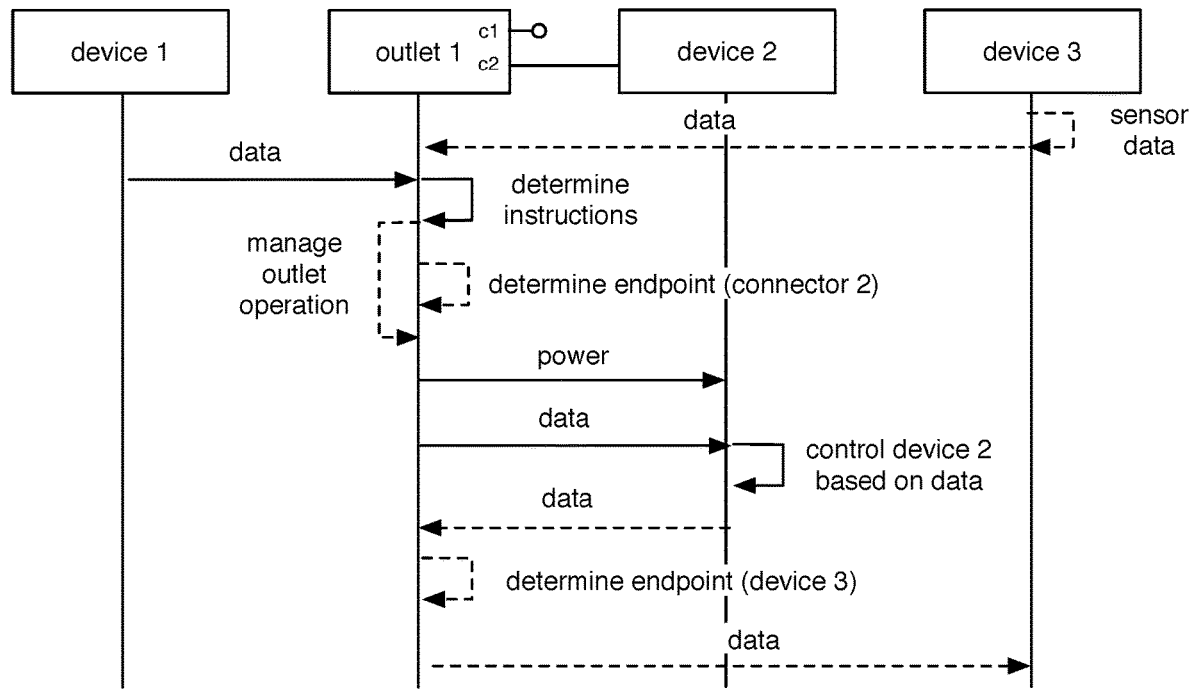
FIG. 16 is a schematic representation of a second example of the method, including receiving data from a device at a first outlet; determining instructions based on the data; managing power provision to an electrically connected second device based on the instructions; and sending control instructions to the second device operation, wherein the control instructions are based on the data.

The method can additionally include managing second device operation based on the set of instructions (example shown in FIG. 16). The second device can be controlled via a wired or wireless data connection. The second device can be controlled based on the first set of instructions (received from the first device), contextual data (e.g., outlet sensor measurements, external sensor measurements, second device measurements, etc.), or based on any other suitable set of data. Examples of second device control include: changing a volume setting, changing channels, playing or displaying audio-visual data, or controlling any other suitable component of the second device in any other manner.

The method can also include managing power outlet operation based on the first set of data and/or the set of information (example shown in FIG. 16). The power outlet can be controlled based on the first set of instructions (received from the first device), contextual data (e.g., outlet sensor measurements, external sensor measurements, second device measurements, etc.), or based on any other suitable set of data. Examples of power outlet operation parameters that can be controlled include: power outlet power consumption (e.g., turning on and off any light-emitting sub-components attached to the housing 110 of the power outlet 100, disabling or enabling power provision to any of a plurality of devices connected to the power outlet 100, etc.), power outlet component operation (e.g., adjusting the parameters of light emitted by the light emitters, switching communication protocols at the communication module, etc.), or controlling any other suitable power outlet component or functionality in any other suitable manner.

2.4 Receiving a Second Set of Data

Receiving a second set of data S260 from the second connected device functions to obtain data from the second device as a result of managing the power provided to the second connected device. This is preferably performed by the data connector 140*a* and communication module 160 of the power outlet 100 over a wired data connection to the second device, but can alternatively be performed by a wireless connection, or with one or more additional devices as intermediaries (e.g., a wired or wireless network hub, a remote server, or a mobile device). The second set of data preferably refers to the result of managing the power of the second connected device, and thus preferably occurs subsequent to managing the power, but it can alternatively occur concurrently or at any suitable time. The second set of data can be the first set of data, be separate and distinct from the first set of data, or be any other suitable set of data. The second set of data can include data in the form of images, operational status, power usage statistics or time-history, audio-visual data, confirmation data, identification information, or any other suitable type of data generated as a result of managing the power to the second device. Receiving a second set of data S260 can include packaging the data, repackaging the data, translating the data, or other forms of data processing. The second set of data is preferably received over a wired data connection to the second connected device, wherein the second device preferably possesses only a wired means of data transfer (e.g., a computer monitor), but alternatively the second set of data can be received wirelessly from a second device possessing a wireless means of data transfer.

2.5 Transmitting Data

The method 200 includes transmitting the second set of data S270 to a third device, which functions to report the results of the power management of the second device to a third device connected to the power outlet 100 (example shown in FIG. 15). This is preferably performed by the power outlet's 100 communication module 160 via wireless communication, but can alternatively be performed by any other suitable means for data transfer over a wired or wireless data connection. The third device is preferably connected to the power outlet 100 via a wireless data link (e.g., on the same Wi-Fi network, a Bluetooth connection), but can alternatively be connected via a wired electrical data connection to the power outlet 100. This is preferably performed after the second set of data is received from the second connected device, but can alternatively be performed concurrently with receipt of the second set of data. Transmitting the second set of data S270 can include additional processing of the data such as packaging, repackaging, addressing, compressing, and transforming the data, or any other necessary processes to achieve suitable transmission. The third device can optionally be the first device, for example when the first set of data was a query generated by the first device and the second set of data is a response to the query that is transmitted back to the first device via the connectivity-enabled power outlet 100.

2.6 Addressing and Transmitting

Figure 14:
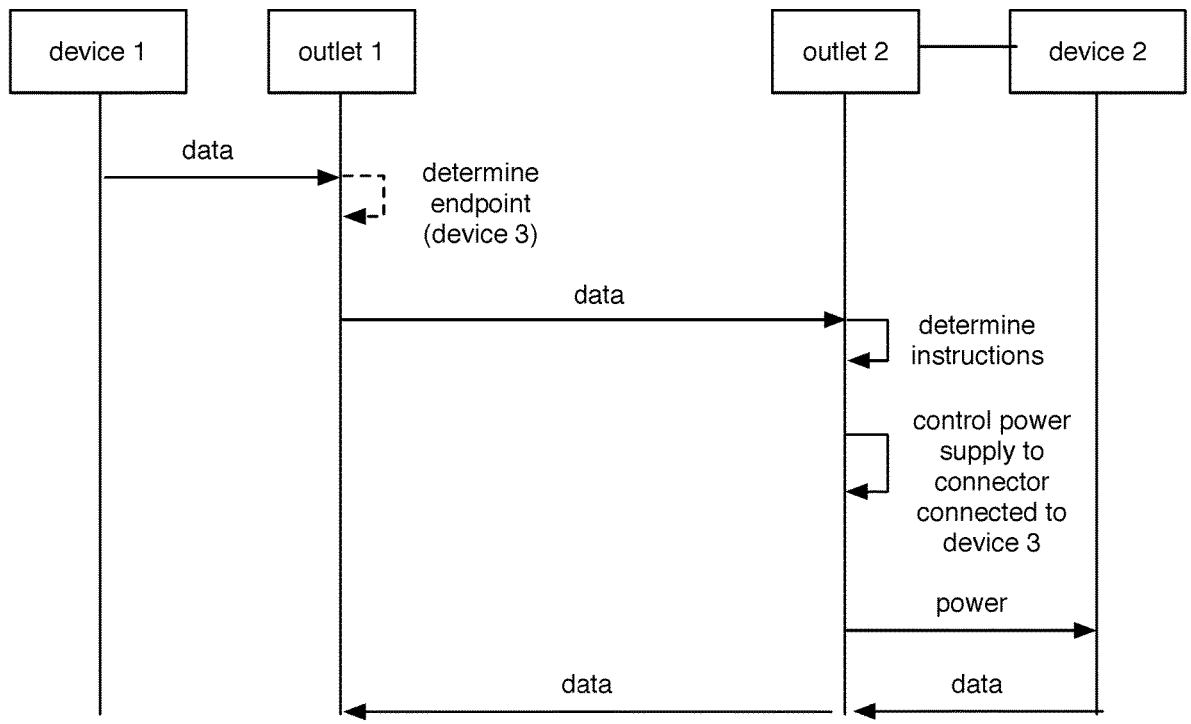
FIG. 14 is a schematic representation of a first example of the method, including receiving data from a device at a first outlet, sending the data to a second outlet connected to a desired endpoint, determining instructions based on the data, and controlling the endpoint, here, a second device connected to the outlet, based on the instructions.

The method 200 optionally includes determining an endpoint address based on a set of data, transmitting the data S270 to a second power outlet 100, and receiving the first set of data at the second power outlet 100, which then performs the previously described portions of the method 200 (example shown in FIG. 14). The set of data can be the first set of data, the second set of data, a combination of the first set of data and the second set of data, contextual data, a combination of the first set of data, the second set of data, and the contextual data, or any other suitable set of data based on which which an endpoint address can be determined. This is preferably performed by the processing unit 170 and communication module 160 of the first power outlet 100, but can alternatively be performed by any other suitable component or system. An endpoint address is preferably a set of data containing identifiers for the intended recipient of transmitted data, which is necessary to ensure transmitted data is received by the appropriate second power outlet 100. The endpoint address can identify a second power outlet, a device connected to a power outlet, a power or data connector of a power outlet (e.g., based on the device connected to the respective connector), a remote system, a user device, or identify any other suitable endpoint. Examples of endpoint addresses include IP addresses, unique outlet identifiers (e.g., unique identifiers from the manufacturer of the first or second device, locally unique identifiers when the outlet 100 connects to a local network, etc.), user-assigned identifiers, or any other suitable outlet identifier. However, the endpoint address can include any other suitable information. Determining an endpoint address (addressing) can include identifying the origin of the first set of data and determining the endpoint address based on the origin of the first set of data (e.g., wherein the origin is associated with the endpoint address in a database). It can additionally or alternatively include determining an endpoint address based on stored preferences, preferences recalled from a remote storage location, contextual data collected by the power outlet 100, an address included in the first set of data, or any other suitable basis for determination. Transmitting the first set of data S230*b* can include modifying the first set of data S230*a*, combining the first set of data with contextual data, or any other suitable transformation of the first set of data prior to transmission.

In an alternative variation, the transmitted set of data or instructions can be broadcast to a plurality of connected outlets or other devices. In this variation, the connected outlets receive the transmitted data and control devices connected to the respective outlets based on the received data. Controlling devices can include maintaining the power provision to the connected device, altering the power provision to the connected device, sending commands or instructions to the connected device over a data connection, or determining whether the connected device can be controlled based on the received data or instructions and controlling the connected device according to the received data or instructions if the device qualifies to be controlled. Alternatively, controlling devices can include any suitable form of control or connection.

2.7 Identifying a Connected Device

The method 200 optionally includes identifying a connected device automatically, which functions to provide device identification data regarding the origin of any received data or preferred destination of any received, generated, or collected data. This is preferably performed by the processing unit 170 in conjunction with the communication module 160 and I/O module 150 of the power outlet 100, but alternatively can be performed by any combination of power outlet 100 components or other suitable system. Identifying a connected device automatically can include identifying a connected device based on: identification information supplied over a data connection to the power outlet 100; inference based on the characteristics of the data received by the power outlet 100 from the connected device; inference based on the characteristics of the power provided by the outlet 100 to the connected device (e.g., current draw, voltage drop, phase shift, modulation, etc.), or any other suitable identifying data or behaviors. For example, a device can be a webcam connected via a USB power and data connection, over which the identity of the device is communicated in the form of serialized data. In another example, the device can be a 14 Watt light bulb, and the identity of the device is determined by the power outlet 100 based on the power drawn from the light bulb when in the powered state. Identifying a connected device can include producing device identification data, where examples of device identification data include: the name, function, type, manufacturer, usage history, a unique device identifier (e.g., the IP address, manufacturer assigned identifier, automatically assigned identifier, etc.), or state of the device, or any other suitable set of data identifying the device.

2.8 Learning from Preferences

The method 200 can optionally include learning from user preferences or behavior, which can include storing received data; storing contextual data S240 and associating the contextual and received data; computing a pattern from the stored contextual and received data to produce a record; receiving an additional (third) set of data; and determining a set of instructions S220 based on the additional set of data in combination with the record. This functions to enable learning from repeated behaviors or patterns and apply the learned behaviors, stored in the form of records, to the determination of sets of instructions. Learning can include enabling automatic control of connected devices according to pattern recognition, according to contextual information previously stored, or any other suitable process of automatic adjustment of the outlet's 100 response to user or device input. For example, the outlet can automatically turn on an electrically connected webcam in response to the user leaving the house (e.g., based on the user device's GPS signal, based on an external sensor, etc.), where the user historically turns the webcam on within a threshold time period after leaving the house. However, historical outlet and/or connected device use can be otherwise analyzed and utilized.

3. Examples of the Method

In a first specific example of the method 200, the power outlet 100 acts as a means for controlling a webcam from a mobile phone. The mobile phone is the first device, connected to the power outlet 100 via a wireless connection (e.g., over a Wi-Fi network). The webcam is the second device, connected to the power outlet 100 via USB. A command is wirelessly sent from the mobile phone to the power outlet 100 to turn on the webcam, wherein the command represents the first set of data. The power outlet 100 receives the command, and determines that power should be provided to the webcam, wherein the determined set of instructions is to provide power to the webcam. The power outlet 100 provides power to the webcam via a powered USB connection, constituting management of the power provided to the webcam. The webcam initiates a video stream after receiving power, and sends the video stream to the power outlet 100 via the USB connection, wherein the video stream represents the second set of data.

In a second specific example of the method 200, two power outlets act as relays for audio-visual (A/V) data transmitted between two connected wired devices. A computer is connected to a first power outlet 100 via a first HDMI wired connection, and sends A/V data over the HDMI connection to the first power outlet 100. The first power outlet 100 identifies that an A/V data source is connected to the first power outlet 100, and determines the correct power outlet 100 to send the A/V data to, wherein this determination is addressing the A/V data. The first power outlet 100 addresses the A/V data to a second power outlet 100, which is connected to a monitor screen via a second HDMI wired connection and a grounded NEMA5-15 wall plug wired connection. In this specific example, the second power outlet 100 is located in a separate room of the same building as the first power outlet 100. The first power outlet 100 transmits the A/V data to the second power outlet 100 via modulation of the alternating current power line waveform, wherein both power outlets are connected to the same local power source comprising the electrical wiring of the building. The second power outlet 100 receives the A/V data, and turns on the connected monitor by supplying power to the monitor via the wired wall plug power connection. The second power outlet 100 transmits the A/V data to the monitor connected to the second power outlet 100 via the second HDMI wired connection. The second power outlet 100 receives playback confirmation from the connected monitor, and transmits the playback confirmation data to the first power outlet 100. The first power outlet 100 receives the playback confirmation data, and transmits the playback confirmation data to the computer connected to the first power outlet 100 via the first wired HDMI connection.

In a third specific example, several power outlets form a network and communicate sensor information and other data over the network to form a connected energy management system in a building. The building is equipped with connectivity-enabled power outlets in several rooms, such as an entryway, a kitchen, a bathroom, a living room, and a bedroom. A person enters the building into the entryway, and a motion sensor on a first outlet 100 located in the entryway receives data that the person has entered the entryway and is moving towards the living room. The first power outlet 100 determines a set of instructions to turn on the lights in the living room, and addresses the set of instructions to a second power outlet 100, which is located in the living room. The first power outlet 100 transmits the instructions to the second power outlet 100, and the second power outlet 100 receives the instructions. The second power outlet 100 is connected to a dimmable lamp via an ungrounded NEMA 1-15 wall plug, and upon receiving the set of instructions from the first outlet 100, proceeds to supply power to the lamp such that it is at 50% of its maximum brightness. The second power outlet 100 includes a laser-rangefinding sensor, and collects data that indicates the person is moving further into the living room. Upon collecting the contextual data S240, the second power outlet 100 determines that the appropriate light level is 75% of max brightness based on learned and stored user preference data, in conjunction with data regarding the ambient light level and time of day. Upon determining the appropriate light level, the second power outlet 100 increases the power supplied to the connected dimmable lamp.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method comprising:
   at a power-management device, generating a first set of data for a first device connected to the power-management device;
   determining a set of instructions based on the first set of data; and based on the set of instructions, regulating a second device, comprising:
- at the power-management device, receiving a second set of data from the second device electrically connected to the power-management device, the second set of data comprising a power usage parameter;
- receiving a third set of data from a secondary monitoring device; and
- determining an occurrence of a trigger event based on the second set of data, and in response, based on the second set of data, reporting a result of a power consumption of the second device, wherein the result is based on the third set of data.

2. The method of claim 1, wherein the power-management device comprises a power outlet.

3. The method of claim 1, further comprising, after determining the occurrence of the trigger event, modifying a power consumption of the second device.

4. The method of claim 1, further comprising: storing the second set of data, wherein the result of the power consumption of the second device comprises a power consumption history of the second device.

5. The method of claim 1, wherein the occurrence of the trigger event is determined based on a threshold.

6. The method of claim 1, wherein the power-management device is located within a building, wherein secondary monitoring device is located external relative to the building.

7. The method of claim 1, wherein the secondary monitoring device comprises a temperature sensor.

8. The method of claim 1, further comprising a remote processing system wirelessly connected to the power-management device.

9. The method of claim 8, wherein the power-management device is connected to the remote processing system via a wireless mobile network.

10. The method of claim 8, wherein the power-management device is wirelessly connected to the remote processing system via a low power radio frequency network.

11. The method of claim 1, wherein the first set of data comprises a power usage parameter.

12. The method of claim 11, further comprising generating power usage statistics for the first device based on the power usage parameter.

13. The method of claim 1, wherein the first set of data comprises power usage analytics for the first device.

14. The method of claim 13, wherein the power usage analytics are generated by the power-management device.

15. The method of claim 1, further comprising:
- at the power-management device, receiving a second set of instructions from a control system, the second set of instructions comprising a user preference; and
- modifying the power consumption of the second device based on the second set of instructions.

16. The method of claim 1, wherein the second device comprises an air conditioner.

* * * * *